US007208020B2

(12) United States Patent
De Mol Van Otterloo

(10) Patent No.: US 7,208,020 B2
(45) Date of Patent: Apr. 24, 2007

(54) SYSTEM AND METHOD FOR PRINTING WITHIN A NETWORK LABELS TO BE USED FOR THE RETURN OF COMPONENTS

(75) Inventor: Maarten Joost De Mol Van Otterloo, Voorburg (NL)

(73) Assignee: Canon Europa N.V., Amatelveen (NL)

( * ) Notice: Subject to any disclaimer, the term of this patent is extended or adjusted under 35 U.S.C. 154(b) by 115 days.

(21) Appl. No.: 10/751,716

(22) Filed: Jan. 5, 2004

(65) Prior Publication Data

US 2004/0195307 A1 Oct. 7, 2004

(30) Foreign Application Priority Data

Jan. 7, 2003 (EP) ................................ 03000201

(51) Int. Cl.
*G06F 19/00* (2006.01)

(52) U.S. Cl. .................................... 23/385; 235/462.01

(58) Field of Classification Search ................ 235/385, 235/462.01
See application file for complete search history.

(56) References Cited

U.S. PATENT DOCUMENTS 6,233,409 B1 * 5/2001 Haines et al. ................. 399/10
6,512,894 B2 * 1/2003 Takemoto et al. ............ 399/12
6,529,692 B1 * 3/2003 Haines et al. ................. 399/27
2002/0012541 A1 1/2002 Takemoto et al. ............ 399/12
2002/0076223 A1 6/2002 Kurz et al. ................... 399/12
2003/0023496 A1 1/2003 De Mol Van Otterloo et al. ........................... 705/22
2004/0004073 A1 * 1/2004 Clothier ....................... 219/620

FOREIGN PATENT DOCUMENTS

EP 1 274 024 A1 1/2003
GB 2 380 574 A 4/2003
WO WO 02/35505 A2 5/2002
WO WO 2004/029727 A1 4/2004

* cited by examiner

*Primary Examiner*—Steven S. Paik
(74) *Attorney, Agent, or Firm*—Fitzpatrick, Cella, Harper & Scinto

(57) ABSTRACT

A system for printing a label to be used to return a component located in an appliance. When a detection unit detects a condition regarding an end of lifetime of the component, a first communication unit sends to a remote server a request to receive data representing information to be included in images on a label to be printed and used to return the component. The request includes information identifying the component to be returned. A second communication unit receives from the remote server the data representing information to be included in images on the label to be used to return the component, the images representing the information identifying the component to be returned.

39 Claims, 8 Drawing Sheets

301 302 303

| Component Type | Status | ID_Component |
| --- | --- | --- |
| Light | operative | Nil |
| Cartridge | EoL | 1234658H4 |
| | | |
| | | |

300

SYSTEM AND METHOD FOR PRINTING WITHIN A NETWORK LABELS TO BE USED FOR THE RETURN OF COMPONENTS

BACKGROUND OF THE INVENTION

This application claims benefit under 35 U.S.C. § 119 of European Patent Application 03 000 201.8, filed Jan. 7, 2003, and the full contents and disclosure of which are incorporated herein by reference.

FIELD OF THE INVENTION

Technical Field

The present invention relates to a system and a method for printing labels to be used for returning disposable components. In particular, the invention provides a system, a method and a set of computer programmes to print labels for returning components (toner cartridges, toner bottles, ink cartridges, spare parts, etc.), which are contained within and can be removed from appliances such as printers, facsimile machines, copying machines, etc.

BACKGROUND ART

Recently, the collection of recyclable components such as toner cartridges, inkbottles, and batteries has become an important issue for obvious environmental reasons. The recycling of components that are dangerous for the environment already takes place. However, a great many disposable components that could be recycled continue to be thrown away. Attempts have been made to avoid such environmentally unfriendly behaviour; but they have proved to be insufficient.

For instance, for many years printer manufacturers have promoted the recycling of toner cartridges. Recycling toner cartridges simply consists of collecting empty cartridges from users and reusing valuable parts. Toner cartridges are packed in a container together with a user's information document comprising one or several labels to be used for the return of used toner cartridges. Once a cartridge is empty, the user needs to cut out a label from the user's information document, to complete the document, to affix it onto a box containing the used cartridges and to send the box to a recycling centre or a collecting centre, via a parcel delivery service or via a postal service.

Obviously, the return of recycling component is highly dependent upon the user's good will. To improve the collection of recyclable items, manufacturers now provide pre-authorised labels. Such labels allow the user to send, for free, used items to a recycling centre or to a manufacturer's centre. To reduce costs, the manufacturer may work only with one parcel delivery company, which would be imposed to the user.

The use of pre-authorised labels included in item containers is still unsatisfactory. The manufacturer must provide, within a same item container, several pre-authorised labels, namely at least one per country where the item is to be sold. The manufacturer is bound to work with the same national delivery company as long as the item is on sale. Furthermore, before an item is used, it is likely that the customer misplaces the corresponding pre-authorised label. Finally, pre-authorised labels are easy to copy and it is difficult to prevent the use of such forged pre-authorised labels. Similarly, the return of counterfeit items or of items from different manufacturers is difficult to control and to avoid.

Recently, new methods have been proposed. For instance, European patent application EPO1116317.7 discloses a method for the return of recycling items where pre-authorised labels can be ordered through the Internet from manufacturer websites. Such a method has proved to be very useful in solving many of the above-mentioned problems. For example, implementing such a method reduces the workload generated by the need of enclosing a plurality of labels within the same container, it also reduces the risk of loosing the labels, etc.

Besides, a user who is inexperienced with computers may find it difficult to carry out all the steps (connection to the website, answer to a list of questions, etc.) necessary for ordering pre-authorised labels from the manufacturer's website. Accordingly, the above mentioned method should be improved to take, into account the needs of such kind of users. Furthermore, the problem of using forged pre-authorised labels or the problem of returning counterfeit or different items must be considered as well.

SUMMARY OF THE INVENTION

To resolve the shortcomings outlines above, it is one objective of the present invention to provide a system or method for printing, within a user network, a label to be used for the return of a component.

Another objective of the present invention is to provide a system or method that can detect and inform a user as soon as a component within an appliance connected to the network needs to be replaced.

It is a further objective of the present invention to provide a system or method that can automatically supply a label to be used for the return of a component to a user who is inexperienced with computers.

An additional objective of the present invention is to provide a system or method that avoids the return of counterfeit components or components for which return services are not available.

According to one aspect of the invention, the present invention, which achieves these objectives, relates to a system or method for printing, within a user network, a label to be used for the return of a component.

The system comprises an appliance, such as peripheral equipment, connected to the user network. The appliance itself includes at least one removable component, the component being provided with a first memory means containing information for the identification of the removable component. The appliance further comprises a first means to detect a condition regarding the end of lifetime of at least one of the removable components located in the appliance. The system also comprises a second means, which is connected to the user network and is adapted to communicate, through a second network, with at least one remote server. The second means is adapted to send the remote server a request to receive data representing a label to be used for the return of a component, when the condition regarding the end of lifetime of the component located within the appliance has been detected by the first means. The request comprises the information for the identification of the component.

The system further comprises a third means connected to the user network and adapted to communicate, through the second network, with the remote server; the third means is adapted to receive data from the remote server, the data representing the label to be used for the return of the component; the label includes the information for the identification of the component.

Furthermore, the invention provides a server for generating a label to be used for returning a removable component of an appliance. The server is connected to a network being adapted to communicate with at least one local server connected to the network. The server comprises a means to receive, from at least one local server, at least one request to send the local server data representing a label to be used for the return of a removable component, said request comprising information for the identification of the component. The server further comprises a means to retrieve from the request the information for the identification of the component. The server also comprises a means to authenticate the information for the identification of the component and a means to generate data representing a label to be used for the return of the component, which includes data representing the information for the identification of the component, the data representing the label being generated only if the identification information has been correctly authenticated. The server includes a means for sending the local server data representing the label as well.

The invention refers to a system for printing, within a user network, a label to be used for the return of a component, comprising an appliance and a locale server, connected to the user network The appliance comprises at least one removable component, said component being provided with a first memory means containing information for the identification of the removable component, and a detector to detect a condition regarding the end of lifetime of at least one of the removable components located the appliance. The local server is adapted to communicate, through a second network, with at least one remote server and through the user network with the appliance. The local server is further adapted to send the remote server a request to receive data representing a label to be used for the return of a component when the condition regarding the end of lifetime of a component located within the appliance has being detected by the detector, said request comprising the information for the identification of the component and to receive data from the remote server said data to representing the label to be used for the return of the component, and said label including, the information for the identification of the component.

Furthermore, the invention provides a system for printing, within a user network, a label to be used for the return of a component. The system comprises an appliance connected to the user network. The appliance itself includes at least one removable component, said component being provided with a first memory means containing information for the identification of the removable component. The appliance further includes a first means to indicate a condition regarding the end of lifetime of at least one removable component located within the appliance. The system further comprises a remote server connected to a second network and a second means connected to the user network local server. The second means is adapted to exchange data, through the second network, with the remote server. It is also adapted to send the second server a request to receive data representing a label to be used for the return of a component, when the condition regarding the end of lifetime of a component located within said appliance has been detected by said first means. Such a request comprises information for the identification of the component.

The invention also provides a method for printing, in a user network, a label to be used for the return of a removable component in an appliance being connected to the user network. The appliance comprises at least one removable component and a second means being connected to the user network. The removable component comprises a first memory means containing information for the identification of the component. The second means is adapted to communicate through a second network to a remote server. The method comprises the following steps of:

determining a condition regarding the end of lifetime of the removable component, reading the information for the identification of said component from the first memory means, sending a request, to the remote server, for receiving data representing a label to be used for the return of the removable component, said request containing the information for the identification of the removable component, when the condition regarding the component's end of lifetime has been determined, and receiving, from the remote server, data representing the label to be used for the return of the removable component, said label including the information for the identification of the component.

The invention further provides a method for generating, in a server, a label to be used for returning a removable component of an appliance. The server is connected to a network, being able to communicate through the network with at least one local server. The method comprises the steps of:

receiving from at least one local server at least one request to send the local server data representing a label to be used for the return of a removable component, said request comprising information for the identification of the component, retrieving from the request the information for the identification of the component, authenticating the information for the identification of the component, generating data representing the information for the identification of the component, the data representing the label being generated only if the identification information has been correctly authenticated, and sending the local server data representing the label.

The invention also provides a component adapted to be incorporated in and removed from an appliance that can be connected to a user network. The component comprises a memory means containing information for the identification the component. The information for the identification of the component is unique to every component.

The invention also refers to a local server programmed to become operable to perform the method for printing, in a user network, a label to be used for the return of a removable component.

The invention refers to a storage medium storing instructions for programming a processing apparatus to become operable to perform a method for printing, in a user network, a label to be used for the return of a removable component. The invention refers to a storage medium storing instructions for programming a processing apparatus to become operable to perform a method for generating, in a server, a label to be used for returning a removable component of an appliance.

The invention further refers to a computer program for programming a processing apparatus to become operable to perform a method for printing, in a user network, a label to be used for the return of a removable component. The invention further refers to a computer program for programming a processing apparatus to become operable to perform a method for generating, in a server, a label to be used for returning a removable component of an appliance.

Finally, the invention refers to a signal carrying instructions for programming a processing apparatus to become operable to perform a method for printing, in a user network, a label to be used for the return of a removable component. The invention refers to a signal carrying instructions for programming a processing apparatus to become operable to perform a method for generating, in a server, a label to be used for returning a removable component of an appliance.

DETAILED DESCRIPTION OF THE PREFERRED EMBODIMENTS

Figure 1:
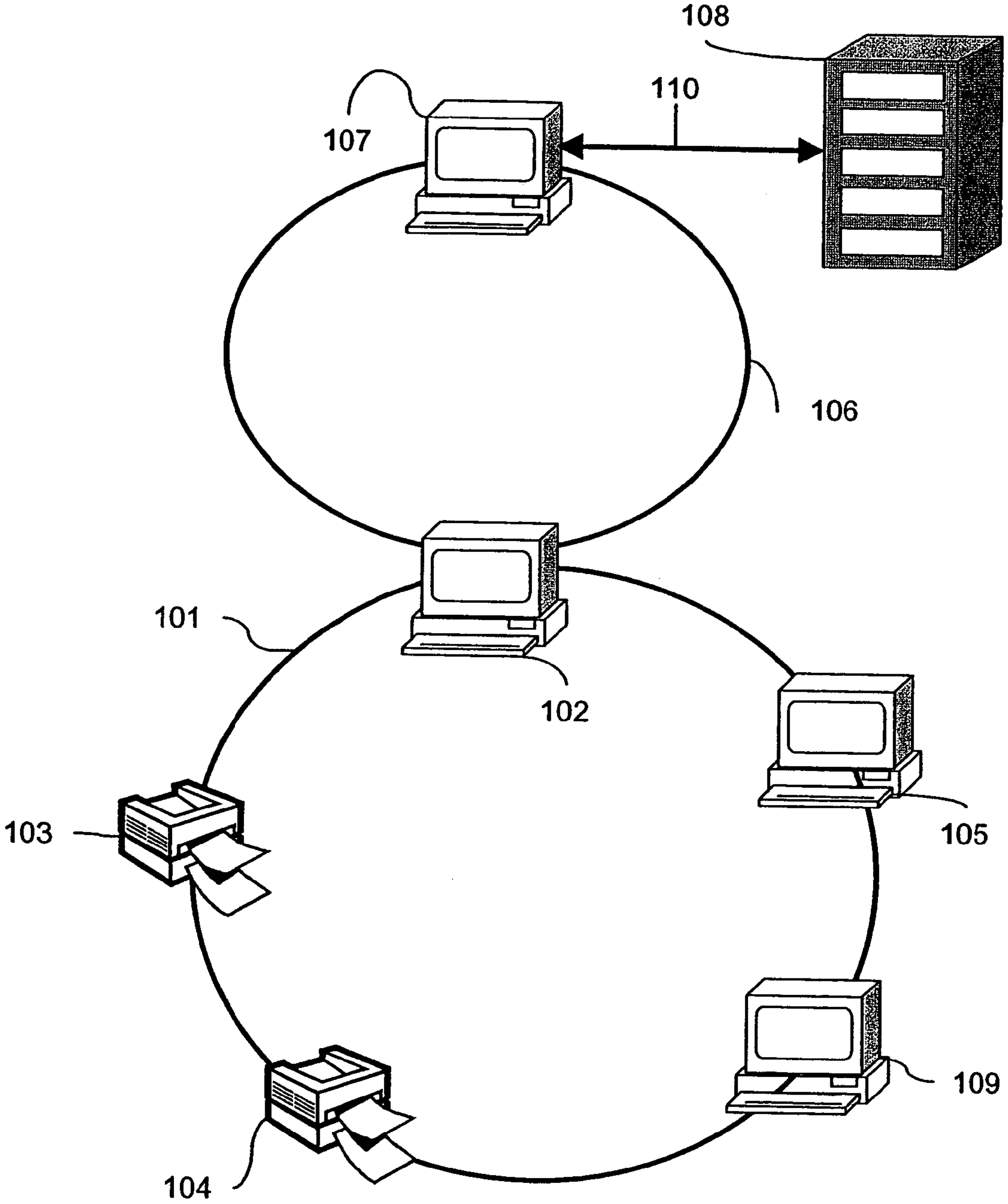
FIG. 1 is an overview of a system for printing a label according to an embodiment of the invention.

FIG. 1 is an overview of a system for printing a label according to an embodiment of the invention.

FIG. 1 depicts a first network 101, such as a wire network using a LAN protocol (for instance Ethernet or Token Ring) or a wireless network (for instance Wireless Ethernet 802.1 lb), to which are connected:

- a local server 102, to access a second network 106
- a plurality of user terminals 105, 109 and
- a plurality of appliances or peripheral equipments 103 and 104.

The various equipment can be connected to the first network 101 through a wire connection (Ethernet . . . ) or though a wireless connection (DECT, 802.11B . . . ). The different elements connected to the first network 101 communicate together according to a standard network protocol (TCP/IP, Ethernet, Token Ring, etc.).

The user terminals 105, 109 allow users to access distributed resources over the first network 101. A user terminal can consist in a Personal Computer (PC), or a Laptop, or Personal Digital Assistant (PDA).

The local server 102 comprises, in a conventional manner, a CPU, a RAM and a ROM. The CPU executes programmes and controls the individuals units. The ROM is used to store fixed data and programmes, which correspond to individual flowcharts that will be described later and which are to be executed by the CPU. The RAM is used to temporally store variables and intermediate data. A program from an external source may be loaded into the RAM and stored therein. A non-volatile memory, such as a hard disc, is configured to store information used for the implementation of the invention. Such information will be described in more detail below. The local server 102 comprises a network interface controller providing a physical connection to the network 101 and can access distributed resources over the first network 101.

The local server 102 is adapted to communicate through a second network 106 with a remote server 107. It is preferable that the second network is an Internet network. Data can be transferred between the local server 102 and the remote server 107 in a number of ways, for example, TCP/IP, or email over the Internet, or using a direct telephone connection, or a wireless connection. The example below assumes that TCP/IP is used.

The remote server 107 comprises, in a conventional manner, a CPU, a RAM and a ROM. The CPU executes programmes and controls the individuals units. The ROM is used to fix data and programmes, which correspond to individual flowcharts that will be described later and which are to be executed by the CPU. The RAM is used to temporarily store variables and intermediate data. A program from an external source may be loaded into the RAM and stored therein. A non-volatile memory, such as a hard disc, is configured to store information used for the implementation of the invention. Such information will be described in more detail below. The remote server 107 comprises a network interface controller providing a physical connection to the network 107 and can access distributed resources over the second network 107.

Furthermore, the remote server 107 has access to a memory 108 preferably via an intranet connection 110, though an Internet connection could be used. In an alternative embodiment, the remote server hosts the memory 108. The memory 108, preferably a means for large capacity storage, is configured to store information used for the implementation of the invention. Such information will be described more in detail below.

The appliances 103, 104 are peripheral equipment such as printers, copying machines, facsimile machines, etc., which can be accessed by users connected to the first terminal 101 via user terminal 105, 109. The appliance 103 comprises at least one removable and preferably recyclable component 210 (not represented in FIG. 1). In a preferred embodiment of the invention, the appliance 103 is a printer and will be henceforth referred as such, though it is understood that any peripheral equipment comprising at least one removable preferably recyclable component could be used instead as will be described in more details below. In an alternative embodiment, where the appliance 103 does not have any printing facility, the appliance 104 is a printer.

Figure 2:
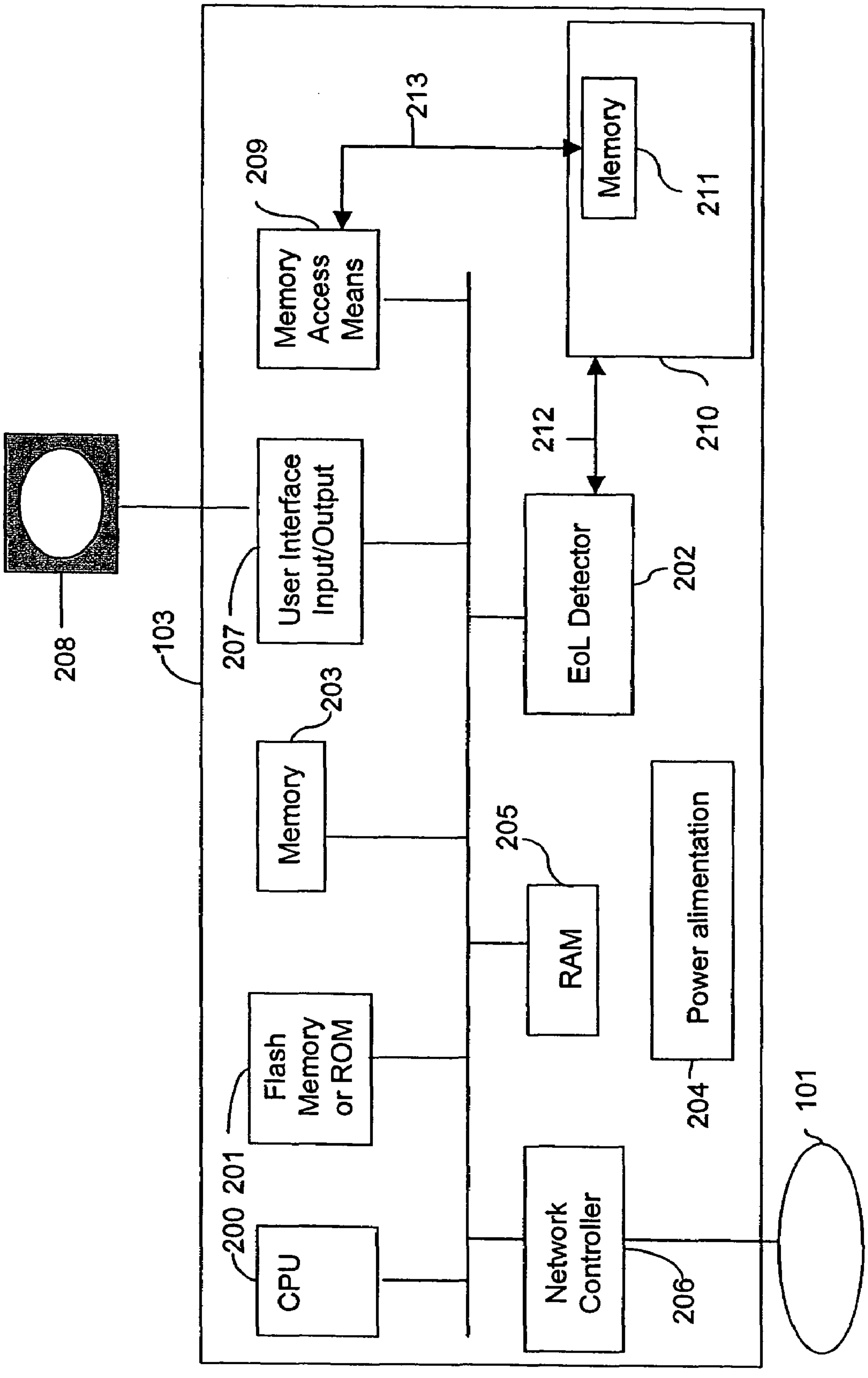
FIG. 2 is a diagram showing the hardware arrangement of peripheral equipment according to an embodiment of the invention.

FIG. 2 depicts, in greater detail, a diagram presenting the hardware arrangement of the printer 103 according to an embodiment of invention.

A network interface controller 206 provides a physical connection to the network 101. A CPU 200 executes a program and controls the individuals units. A ROM 201 is used to store programmes, which correspond to individual flowcharts that will be described later and which are to be executed by the CPU 200 and fixed data. A RAM 205 is used to temporally store variables and intermediate data. A program from an external source may be loaded into the RAM 205 and stored therein.

A power supply 204 delivers power to keep the different units of the printer 103 working.

A non-volatile memory 203, such as a hard disc, is configured to store information used for the implementation of the invention. Such information will be described in more detail below.

A user input/output controller 207 is arranged to process input from the user input/output device 207 and to provide control for the other units. Furthermore, the user input/output controller 207 is arranged to output data to the user input/output device 207. In a conventional manner, the user input/output device 207 comprises a display device, buttons or tactile screen, loudspeaker, etc.

The printer 103 additionally includes a component 210, such as a toner cartridge, which is an essential component to carry out printing processes. The component 210 has a limited life cycle; when it reaches its end of life, no printing process can be carried out or, if carried out, at an insufficient standard. It must be replaced as soon as it has reached its end of life by another equivalent component, in order to avoid the printer 103 breaking down or misprinting documents. The component 210 comprises a memory 211, wherein an identification number is stored. Every component has a unique identification number ID_Component. Preferably, it corresponds to a serial number allocated by the manufacturer.

A memory access means 209 is arranged in the printer 103 to access data stored on the memory 211. In a preferred embodiment of the invention, the memory 211 consists of a microchip embedded in the removable component 210, whereas the memory access means 209 comprises, in a conventional manner, a microchip connector 213.

An end of life (EoL) detector 202 detects when a condition, regarding the end of lifetime of the removable component 210, occurs. For instance, the detector 202 can detect when the removable component 210 is reaching its end of life. Alternatively, the detector 202 may detect when the removable component 210 is getting close to its end of life, in order to have some leeway before the printer 103 breaks down or starts misprinting.

In view of simplifying the description, the detector 202 will be henceforth referred as an end of Life (EoL) detector 202, whether it detects when the component 210 actually reaches its end of life or when it the component 210 is approaching of its end of life.

In a preferred embodiment, the removable component 210 consists of a toner cartridge, which must be removed as soon as it is empty. A conventional EoL detector, to detect when a toner cartridge is reaching or approaching its end of life, may comprise two electrodes to connect the toner of the cartridge to a predetermined potential and a means to establish an electrical field through the toner of the cartridge. The EoL detector also comprises a means to measure the electrical field passing through the toner in order to produce an electrical signal representing the electrical field. A programme stored in the ROM 201 is used to calculate the amount of toner remaining in the cartridge according to the electrical signal and to output data indicating whether the cartridge is empty or not.

In a preferred embodiment of the invention, the appliance 103 is a printer. It is understood that any peripheral equipment comprising at least one removable component could be used instead.

For instance, in an embodiment, the invention can apply to a scanner, the removable component consisting in the scanner light. The EoL detector comprises a means to detect any drop in the light's intensity.

In other embodiments, the invention can apply to other appliances such as Personal Digital Assistants (PDA) or digital cameras connected to the network 101 and powered by batteries. The EoL detector would comprise a means for detecting when the battery is flat, which is provided in such appliances, in a conventional manner.

A plurality of removable components, each including a memory, may be located within the printer 103. In a preferred embodiment, a single memory access means 209 is configured to read information from each memory embedded in the different removable components. Alternatively, a memory access means per removable component will be provided to access the component memory. Similarly, in a preferred embodiment, a single EoL detector 202 is configured to detect when each removable component is reaching or approaching its end of life. Alternatively, an EoL detector per removable component is provided.

Figures 3A, 3B:
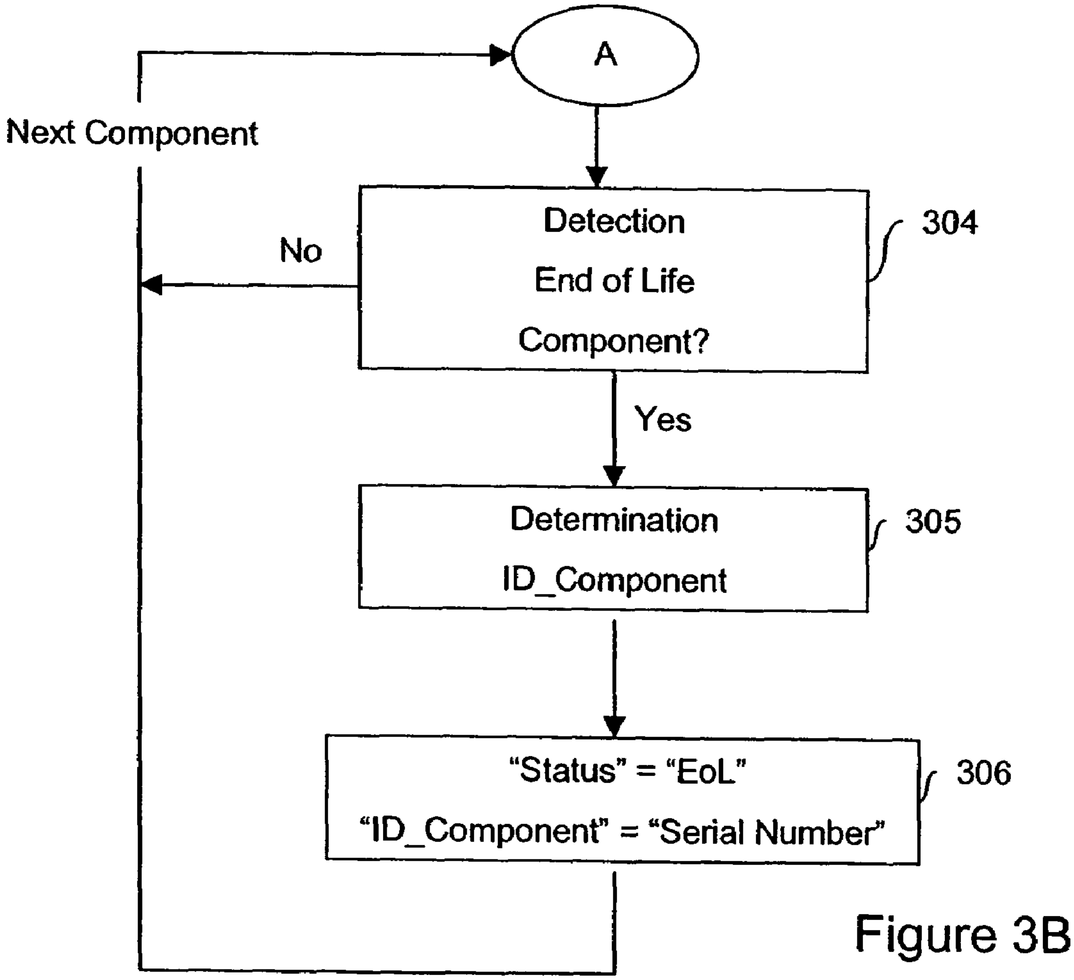
FIG. 3A is a representation of a correspondence table stored in the memory of peripheral equipment.
FIG. 3B is a flowchart showing, according to a first embodiment of the invention, the processing performed by peripheral equipment when the component of said equipment is to be removed.

FIG. 3A represents information, contained in a correspondence table 300, relating to the removable components 210 located in the printer 103. Table 300 may be stored in the memory 203. The first column 301 comprises information concerning the type of removable component 210 used in the printer 103, for instance a toner cartridge or a lamp. The second column comprises information 302 concerning the status of the components 210 currently used within the printer 103, namely indicating whether a component is "operative" or has reached or approached its end of life "EoL" or is absent of the printer 103 "NIL". The third column 303 specifies the identification number ID_Component of the component. The value "NIL" is used when no XD Component is available. When a component is removed from the printer 103, the corresponding values of ID_Component and Status are automatically set up to "NIL".

FIG. 3B represents a flowchart presenting the processing performed by the printer, when the component 210 is to be removed according to a first embodiment of the invention. The program, which corresponds to the flowchart, is stored in ROM 201 and is to be executed by the CPU 200.

At step 304, a check is performed to determine whether or not the component 210 has reached or approached its end of life. In a preferred embodiment, a check is performed to evaluate the information output by the EoL detector 202.

When it is ascertained that the component 210 does not need to be replaced, the programme control returns to step 304 to execute the same check for another component. If the component 210 needs to be replaced, the programme control advances to step 305. At step 305, the memory access means 209 reads the identification number ID_Component of the component 210 stored in the memory 211. The program control advances to step 306 and the line of table 300, corresponding to the component 210, is updated; the identification number ID_Component is entered in column 303 and the status in column 302 is set at the value "EoL". Alternatively, the identification number ID_Component is filled in the column 303 when the component 210 is first placed in the printer 103. In this case, step 305 becomes redundant and is no longer necessary. As soon as table 300 is modified, the program control returns to 304, checking whether or not another component needs to be replaced.

Figure 4:
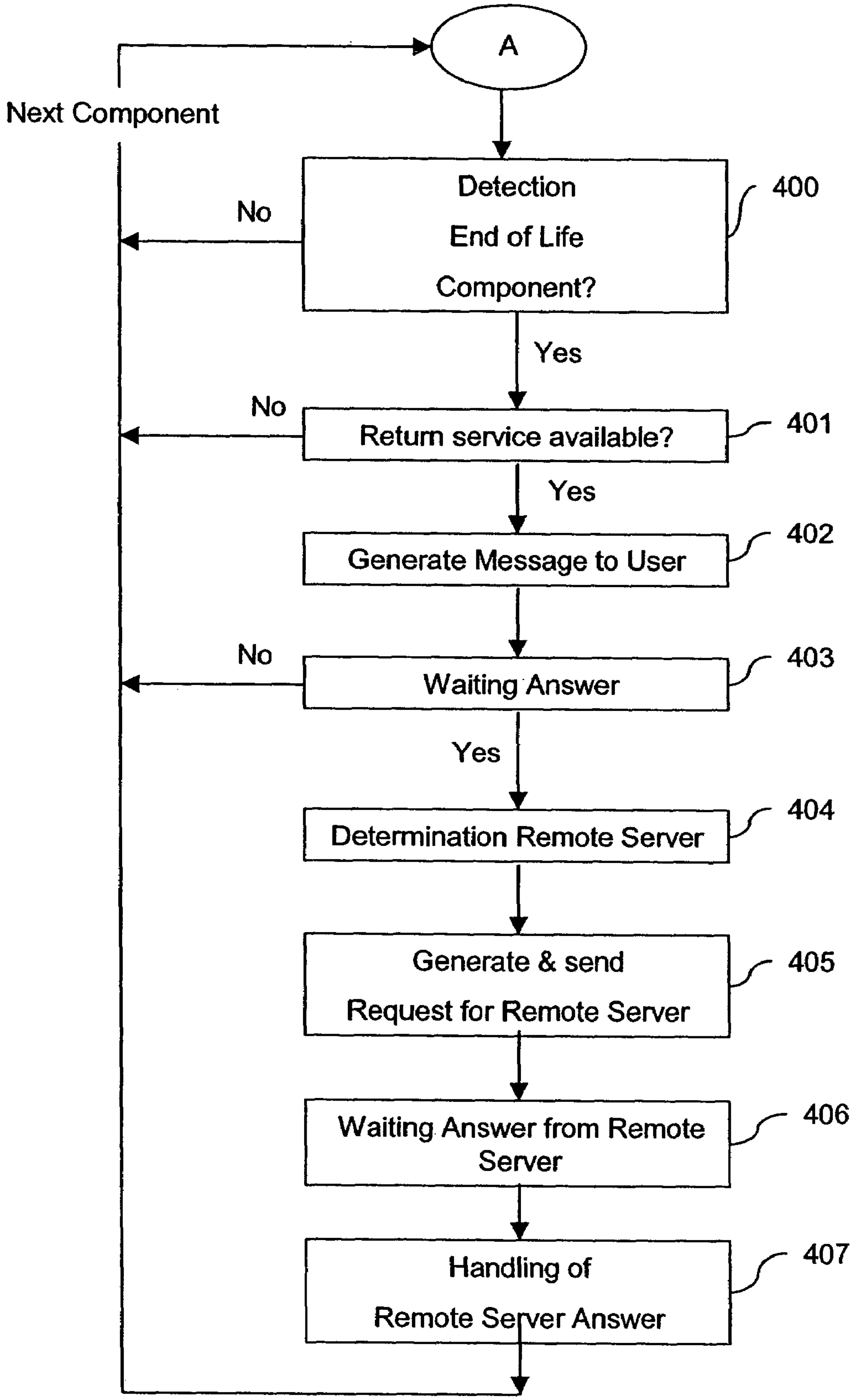
FIG. 4 is a flowchart showing, according to a first embodiment of the invention, the processing performed by a local server, when a component of peripheral equipment is to be removed.

FIG. 4 represents a flowchart showing the processing performed by the local server 102 when the component 210 is to be removed.

At step 400, a check is performed to determine whether or not the component 210 located in the printer 103 has reached or approached its end of life. If it is ascertained that any component does not need to be replaced, the program control returns to step 400 and execute the same check for other components of another appliance connected to the first network 101. If at least one of the components located in the printer 103 needs to be replaced, the programme control advances to step 401. In a preferred embodiment, step 400 is performed by the local server 102 polling regularly (every 5 seconds for instance) the table 300 located in the memory 203 of the printer 103. If the status of a component 210 equals "EoL", the local server 102 retrieves, from table 300, the type of the component 210 and its identification number ID_Component. The identification number ID_Printer of the printer 103 is also determined. The identification number ID_Printer can be either stored in the memory 203 of the printer 103 or in a memory located within the local server 102.

At step 401, a check is performed to determine whether the component 210 can be returned to a recycling company or to a manufacturer's retailer. In a preferred embodiment, this check is performed according to the component type. For instance, an update of the components which can be returned may be provided over the Internet on the manufacturer website. Alternatively, only information about components, which can be returned to the manufacturer or to a recycling centre, is stored in the table 300. With such an embodiment, step 401 becomes unnecessary and can be omitted. In another embodiment, a parameter indicating whether or not the component can be returned or recycled in stored in the memory 211 of the component 210. The parameter is stored in a specific column in table 300, when the component is first placed in the printer or when the component reaches or approaches its end of life. Step 401 then consists in the local server 102 reading such parameter when accessing, at step 400, the memory 203 located in the printer 103.

If it is ascertained that the component 210 can be returned to a manufacturer retailer or to a recycling centre, the programme control advances to step 402. Otherwise the programme control returns to step 400 to execute to another component. At step 402, identification information on the user who is responsible for the printer 103 is determined. The user identification information may consist of the user network address, its e-mail or an alias. In a preferred embodiment, the identification information of the user is stored in the memory 203 of the printer 103, which can be accessed by the local server 102. Alternatively, the user identification information, recorded in a memory within the local server 102, is determined according to the printer's 103 identification number. A message is then generated for the user. In a preferred embodiment, the message consists of a window opening on the display of the user terminal 105, 109. Alternatively, an e-mail provided with a hyperlink is sent to the user. When clicking on the hyperlink, the message window opens. The program control then advances to step 403.

Figure 5:
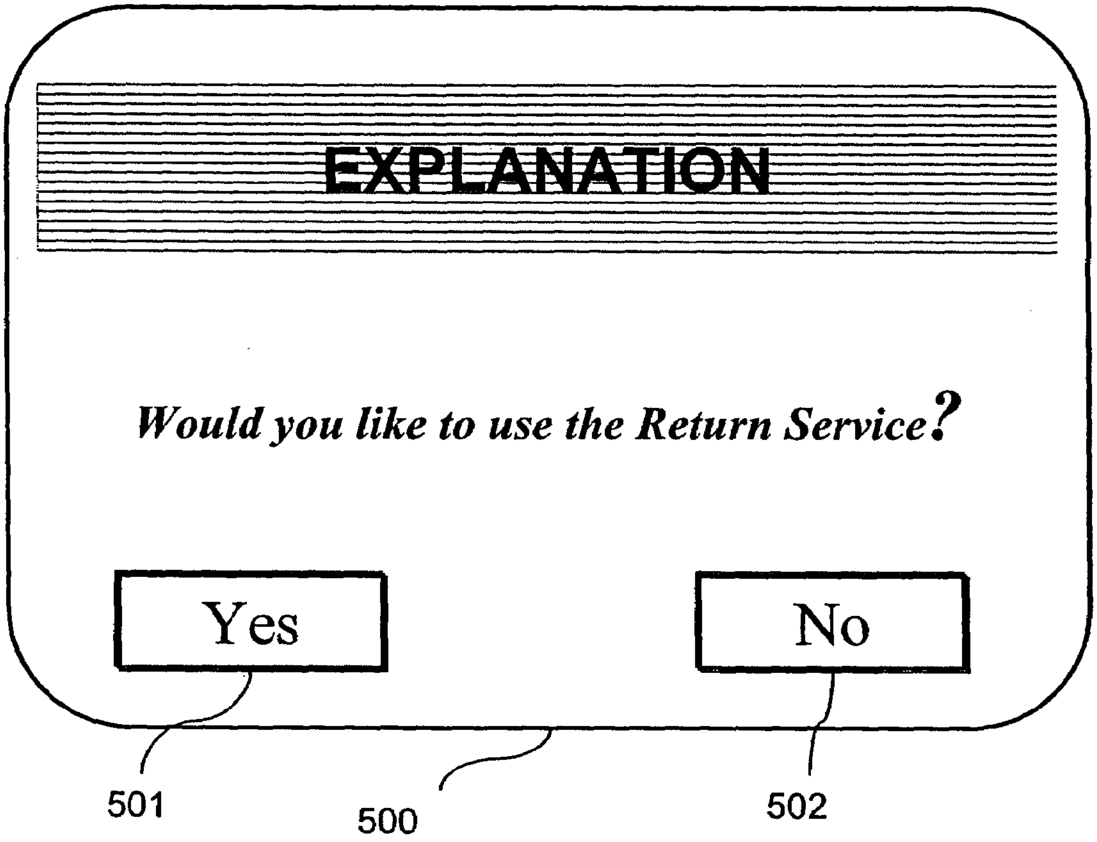
FIG. 5 is a message window, which is opened on a user terminal display to inform the user that a component of peripheral equipment must be replaced.

The message window 500, as shown in FIG. 5, informs the user that the component 210 must be replaced and asks him if he wishes to use the return/recycling service available for the component 210. Advantageously, the user is informed as soon as the component 210 must be replaced and can immediately take the necessary steps to replace the used component. Thus the period during which the printer 103 is malfunctioning or non-functioning, can be efficiently reduced. At step 403, the program control waits for a user input, which will be provided as soon as the user clicks on the YES button 501 or on the NO button 502. If the answer is "NO", the program control returns to step 400 and the programme is executed for another component If the answer is "YES", a new window opens asking the user to enter some user identification data, such as his name, address, e-mail address. Once the acquisition of the user's identification data is performed, the program control advances to step 404.

In another embodiment, the programme control does not wait for a user input It can be set as default that the user wants to use the return/recycling service at anytime. In this instance, the window 500 does not comprise any button "NO" or "YES". Similarly, the acquisition of the user's identification data might be performed automatically, the data being stored in a memory within the printer 103 or within the local server 102.

In another embodiment, the window 500 might comprise a button or hyperlink allowing the user to order on-line a new component. When clicking the hyperlink, the user can access the website of a company selling such a component via the Internet Alternatively, the acquisition of further information (such as the number of items the user wishes to buy, etc.) might-be performed in order to inform the remote server as explained below in more detail. In such a case, the user will later receive, via the Internet, a quotation for the purchase of the components.

At step 404, the network address (for instance the IP address) of the remote server 107 is determined. The network address may be determined according to the identification number of the printer 103 or according to the model of the component 210. In a preferred embodiment, the network address of the remote server 107 is stored in the memory 203 of the printer 103, which can be accessed by the local server 102. Alternatively, the network address of the remote server 107 is recorded in a memory within the local server 102; for instance, a user records it through the user input/output device 208, when installing the printer 103. In another embodiment, the network address of the remote server 107 is stored in the memory 211 of the component 210. The address is stored in a specific column in table 300, when the component 210 is first placed in the printer or when the component reaches or approaches its end of life. Once the network address of the remote server 107 has been determined, the programme control advances to step 405.

At step 405, a request for receiving a label to be used for returning the component 210 is generated and sent to the remote server 107. The request comprises the identification number ID_Component of the component 210, the identification of the printer ID_Printer, the identification of the server ID_Server, such as the network address of the server. Data for the identification of the user or owner of the printer 103 can also be provided, such as the user name and its address.

Figure 6:
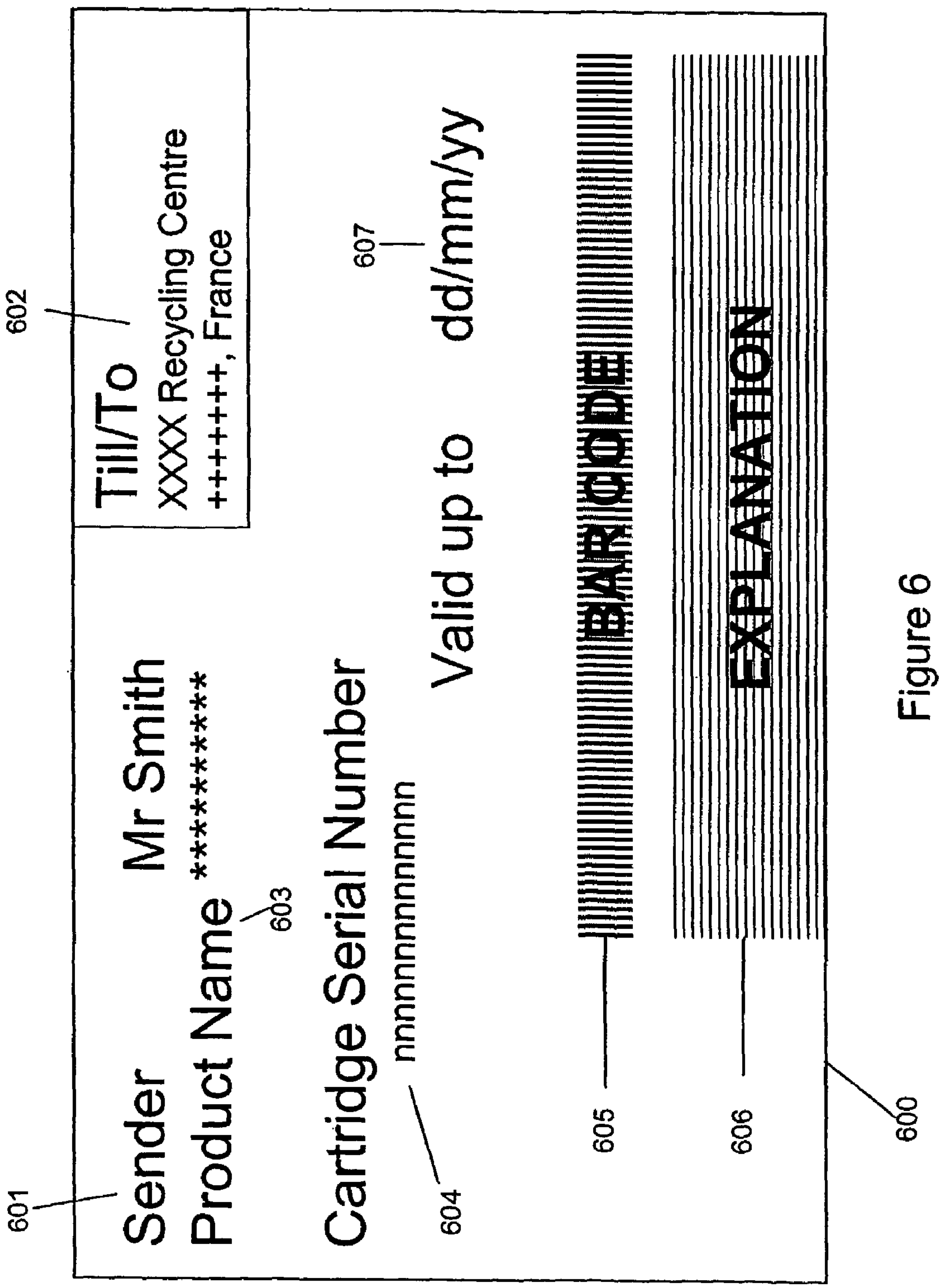
FIG. 6 represents a label to be used for returning an old component of peripheral equipment.

FIG. 6 shows a label 600 that can be used to send a used component to a recycling plant. The process to generate the label 600 according to the invention will be described in detail below. The label 600 may comprise the name of the sender 601, if necessary its address, the name of product 603, the serial number or identification number 604 of the used component, the address of the recycling plant 602, the date 607 until which the user can send the used component using the label 600, a bar code 605 and some explanations 606. The bar code 606 includes information relating to the component to be sent to the recycling plant, such as the type of component and the component's identification number ID_Component. The fact that the unique identification number ID_Component is included in the bar code 605 makes the bar code 605 unique as well. Therefore the use of such bar code is limited and can be easily controlled; the used of forged pre-authorised labels is hindered. In order to send the removable component 210 to a recycling centre or to a manufacturer's retailer, the user needs to put the component in a box. For instance, the manufacturer can provide box and the label 600 may then be affixed onto the box. The box can be collected by a parcel delivery service or dropped-off at the nearest parcel delivery company or at the nearest post office.

At step 406, the program control waits for a response from the remote server 107. Once the answer from the remote server 107 is received, the programme control moves to step 406.

In a preferred embodiment, if the program control has not received any answer after a predetermined period of time, the request, sent in step 405, is sent again until a response for the remote server 107 is received or until the user stops the programme.

At step 407, the answer from the remote server 107 is analysed. If the remote server 107 has accepted to provide the user with a label for the return of the component 210, the response comprises data representing the label 600 to be used for the return of the component 210. In a preferred embodiment, the label data can be presented as a PDF file or RTF file, etc. A message is then generated for the user. In a preferred embodiment, the message consists of a window opening on the display of the user terminal 105, 109. Alternatively, an email provided with a hyperlink is sent to the user. When clicking on the hyperlink, the message window opens. In another embodiment, an email is provided with an attached file representing the label. The email can be sent directly by the remote server 107 to the user, if the user e-mail address has been included within the request sent by the local server 102 to the remote server 107 at step 405. In such a case, steps 406 and 407 are unnecessary and can be omitted.

The window comprises information about the return service and is provided with a button "open" and a button "print"; when clicking on the button "open", the label appears on the user display; when clicking on the button "print", the label is printed out on a printer connected to the network 101.

In a preferred embodiment, the label is sent to the printer 103. The EoL detector 202 detects when the component 210 reaches or approaches its end of life, so that the printer 103 can still print at least one document, namely the label 600. Alternatively, the label 600 is printed on the printer 104.

If the remote server 107 has not accepted to provide the user with a label for the return of the component 210, the response comprises data representing a document explaining the reasons why the user cannot access the return service. For instance, the document might include warnings indicating the component 210 is a counterfeit item.

Once step 407 has been executed, the programme control returns to step 400 and executes the programme for another component.

Advantageously, the user automatically receives a label that he can use for the return of a component to be replaced, without his intervention. Due to such a system, users are further encouraged to return used components to a recycling or collecting centre.

Furthermore, the fact that a unique identification number is allocated to every component and that this unique identification number is included in a bar code embedded in the label 600 hinders the use of forged pre-authorised labels. Likewise, the return of counterfeit items or of items from different manufacturers can be controlled.

Figure 7:
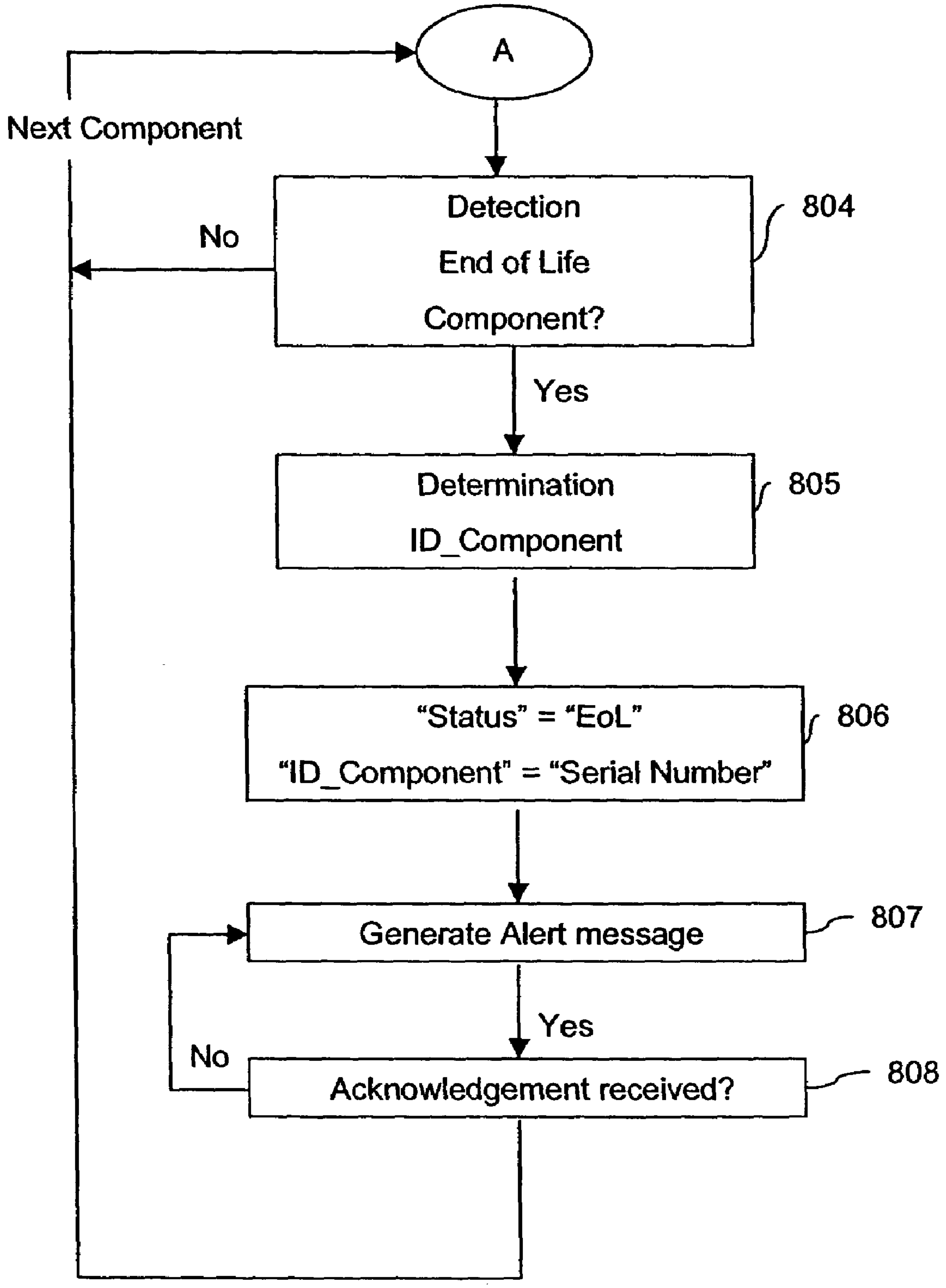
FIG. 7 is a flowchart showing, according to a second embodiment of the invention, the processing performed by peripheral equipment when the component of said equipment is to be removed.

FIG. 7 is a flowchart presenting the processing performed by the printer 103 according to second embodiment of the invention. The program, which corresponds to the flowchart, is stored in ROM 201 and is to be executed by the CPU 200. The printer 103 is able to communicate, through the network controller 206, with units connected to the network 101. More specifically, the printer 103 is able to send data to the local server 102 according to a standard network protocol communication.

The steps 804, 805 and 806 correspond respectively to steps 304, 305, 306 of FIG. 3B and are not explained thereafter.

Once step 806 has been executed, the programme control advances to step 807. At step 807, a message is generated and sent to the local server 102. The triggering message comprises the identification number ID_Component of the component 210, the identification number ID_Printer of the printer 103, its network address, if necessary, identification data of the user in charge of the printer 103, the network address of the remote server 107, the confirmation that the return/recycling program is available to the component 210, etc. All this information is stored in the memory 203 of the printer 103.

Once the triggering message has been sent to the local server 102, the programme control advances to step 808 and waits for an acknowledgment, indicating that the local server 102 has received the triggering message. If, after a certain period of time (5 minutes for instance), no acknowledgment has been received, the programme control returns to step 807. A new triggering message is sent to the local server 102. In a preferred embodiment, if a certain number of triggering messages are sent, without any acknowledgment received from the local server 102, an error message is generated and the programme control stops the programme.

If an acknowledgment is received, the programme control returns to step 804 and executes the program for another component of the printer 103.

In this embodiment, the step 400 of the flowchart of FIG. 4 consists of waiting for a triggering message to be sent by a printer 103. As soon as a triggering message is received, all data necessary for performing the following steps of the programme are retrieved from the message. More specifically, data for the identification of the printer 103 (e.g., the network address of the printer) are immediately retrieved from the triggering message, in order to send an acknowledgment message to the printer 103.

According to a third embodiment of the invention, the printer 103 comprises a network interface controller providing a physical connection to the second network 106 and access to distributed resources over the second network 106. The printer 103 is adapted to communicate through a second network 106 with a remote server 107. Data can be transferred between the printer 103 and the remote server 107 in a number of ways, for example, TCP/IP or e-mail over the Internet or using a direct telephone connection or a wireless connection. In this embodiment, the programme, which corresponds to the flowchart of FIG. 4, is stored in ROM 201 and is to be executed by the CPU 200. The printer 103 is able to send a direct request to the remote server 107 and to receive its answer.

At step 407 of FIG. 4, the answer from the remote server 107 comprises, if the remote server 107 has accepted to provide the user a label for the return of the component 210, data representing the label 600 to be used for the return of the component 210.

More specifically, the label is directly represented as a file, which can be directly processed and printed by the printer 103. In that respect, the request generated, at step 405 in FIG. 4, by the printer 103 to the remote server, comprises identification data of the printer 103. The remote server 107 will use such data to select a specific programme, commonly called printer driver and known by the man skilled in the art, to generate a file representing the label 600, which can be directly processed and printed by the printer 103. A document comprising information about the return/recycling service can be sent by the remote server 107 and printed by the printer 103 in a similar way.

If the remote server 107 does not accept to provide the user with a label for the return of the component 210, the document detailing the reasons why the user cannot access the return service, is sent by the remote server 107 and printed by the printer 103 in a similar way.

Figure 8:
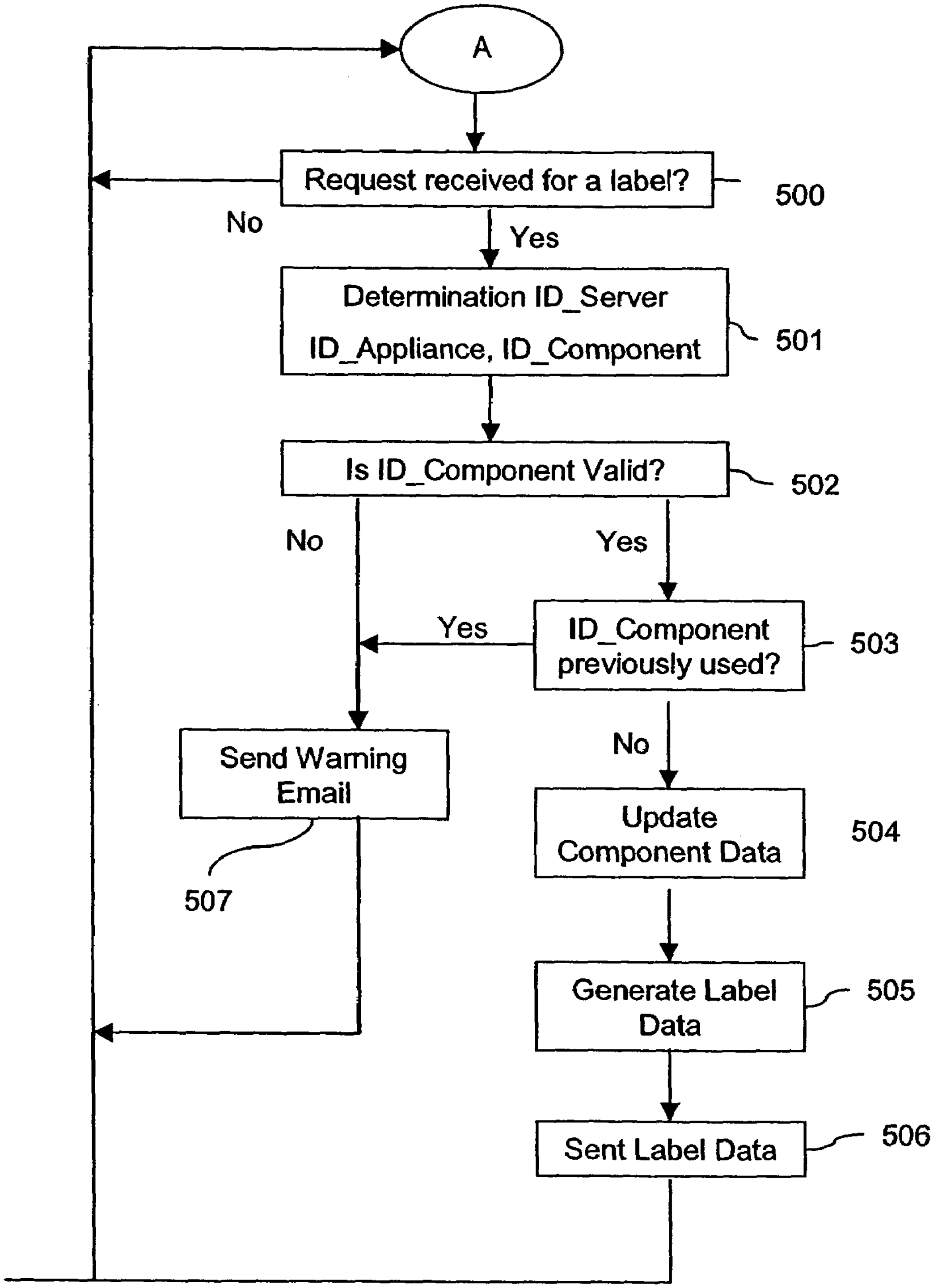
FIG. 8 is a flowchart showing, according to the second embodiment of the invention, the processing performed by a remote server, when receiving a request for a label to be used or returning old component of peripheral equipment.

FIG. 8 is a flowchart presenting, according to an embodiment of the invention, the processing performed by the remote server 107, when receiving a request for a label 600 from the local server 102 (or alternatively from the printer 103). The programme, which corresponds to the flowchart, is stored in the ROM of the remote server 107 and is to be executed by the remote server's 107 CPU.

At step 500, the programme control waits for the reception of a triggering message. According to the first and second embodiments of the invention, the remote server 107 receives the triggering messages from the local server 102. According to the third embodiment of the invention, the printer 103 directly sends triggering messages to the remote server 107.

At step 501, when a triggering message is received, all data necessary for performing the following steps of the programme are retrieved from the message. More specifically, the identification number ID_Component of the component 210, the identification number ID_Printer of the printer 103 and identification data of the local server 102, e.g., the network address ID_Server of the local server, as well as the user's identification data, are retrieved from the request. Alternatively, the printer's 103 identification data are retrieved from the request instead of the identification data of the local server 102. The programme control then moves to step 502. In another embodiment, the user's identification data can be stored in a memory located within the remote server 107 and retrieved according to the printer's identification data or the local server's identification data.

At step 502, a check is performed to authenticate the identification number ID_Component of the component 210. In a preferred embodiment, the remote server 107 accesses a database located in the memory 108 and comprising a list of authentication data of components made by their manufacturer. Identification data are authenticated, if the database contains a set of authentication data associated to the identification. In a preferred embodiment, the authentication data comprises more specifically a serial number assigned to every component made by the manufacturer, the manufacturer, when manufacturing the components, has also recorded the same serial number on the memory 211 embedded in every component. The identification number of a component such as a component serial number is unique to every component made by an authorised manufacturer. In a preferred embodiment, the check performs at step 502 consists of comparing the identification number ID_Component of the component 20 to the authentication data of the database located in the memory 108.

If the identification number ID_Component cannot be found in the database, the identification number ID_Component of the component 210 is not validated. The programme control then advances to step 507.

At step 507, data representing a document, indicating that the return/recycling service cannot be provided on the grounds that the component 210 is probably counterfeited, are generated. The data are sent either directly to the printer 103 or to the local server 102 as explained above. The programme control returns to step 501.

If the identification number ID_Component is found in the database, the identification number ID_Component of the component 210 is validated. The programme control then advances to step 503.

At step 503, a check is performed to determine whether the identification number ID_Component of the component 210 has been previously used. In a preferred embodiment, the check consists in determining whether the authentication data corresponding to the identification number ID_Component, is tagged or not.

If the identification number ID_Component has been previously used, i.e., the corresponding authentication data in the database is tagged, the identification number ID_Component of the component 210 has been illicitly "stolen". The programme control advances then to step 507.

If the identification number ID_Component has never been used, i.e., the corresponding authentication data in the database is not tagged, the programme control advances then to step 504. At step 504, the authentication data corresponding to the identification number ID_Component of the component 210 is updated. In a preferred embodiment, the corresponding authentication data is tagged. Alternatively, the corresponding authentication data is removed from the database located in the memory 108; in such an embodiment, step 503 becomes unnecessary and can be omitted. The programme control advances then to step 505.

In another embodiment, the validation steps 502, 503, 504, 507 may also be performed to check the validity of the identification number ID_Printer of the printer 103. As with the component 210, ID_Printer may correspond to a serial number attributed to the printer 103 when being manufactured.

At step 505, the label 600 is generated in a traditional manner including some security means such as a barcode representing the identification number ID_Component of the component 210. A barcode can also be included representing the identification number ID_Printer of the printer 103. Data may also be generated to represent a label embedding other security elements, such as watermarks, etc. The recycling centre or manufacturer's retailer and its address 602 is determined from a database stored in the memory 108, according to the type of component 210 to be returned, as well as according to the address of the user.

At step 506, the data representing the label 600 to be used for the return of the component 210 is then sent either to the local server 102 or directly to the printer 103, as explained previously, using, for instance, the network address ID_Server of the local server 102 or the network address of the printer 103. In another embodiment, the remote server 107 informs the recycling centre's server that a label for the return of the component 210 has been sent to the user. The programme control then returns to step 500. In another embodiment, the remote server 107 may transfer a purchase order to the server of a company selling the component 210. For instance, the user can complete a purchase order, at step 403, when he is asked whether or not he wants to use the return service.

If the label 600 is to be directly printed out by the printer 103, the remote server 107 selects, before sending the data to the printer 103, a specific programme, commonly called printer driver and known by the man skilled in the art. The driver is selected from a list of drivers stored in the memory 108 according to the identification data of the printer 103 retrieved at step 501. The printer's identification data may include the identification data of the driver, which is currently used by the printer 103. The driver is used when generating data representing the label 600. When receiving the data from the remote server 107, the printer will be able to directly print the label 600, without any further data-processing. Advantageously, a label can be send to a user only if the identification data of the component has been authenticated. As a consequence, a label cannot be delivered to users for counterfeit components or components for which the return service is not provided. Furthermore, component identification data can only be used once. Therefore, to obtain a plurality of pre-authorised labels for the return of counterfeit items, by using a single component identification data, is not possible either.

I claim:

1. A system for printing, within a user network, a label to be used to return a component, comprising:

an appliance connected to the user network, the appliance comprising a removable component, wherein the removable component is provided with a memory storing information identifying the removable component;

a detection unit configured to detect a condition regarding an end of lifetime of the removable component located within the appliance;

a first communication unit connected to the user network and configured to communicate with a remote server through a second network, wherein the first communication unit is configured to send the remote server a request to receive data representing information to be included in images on a label to be printed and used to return the removable component, when the condition regarding the end of lifetime of the removable component located within the appliance has been detected by the detection unit, and wherein the request includes information identifying the removable component to be returned; and a second communication unit connected to the user network and configured to communicate with the remote server through the second network, wherein the second communication unit is configured to receive data from the remote server, including the data representing information to be included in images on the label to be used to return the removable component, the images representing the information identifying the removable component to be returned.

2. A system for printing a label according to claim 1, wherein the first communication unit comprises a local server connected to the user network and is configured to communicate with the remote server through the second network.

3. A system for printing a label according to claim 2, wherein the second communication unit is located within the local server.

4. A system for printing a label according to claim 1, wherein the first communication unit is located within the appliance.

5. A system for printing a label according to claim 1, wherein the second communication unit is located within the appliance.

6. A system for printing a label according to any one of claims 1 to 5, wherein the appliance comprises a messaging unit configured to send the first communication unit a triggering message including the information identifying the removable component, when the detection unit has detected the condition regarding the end of lifetime of the removable component.

7. A system for printing a label according to any one of claims 1 to 5, wherein the appliance comprises a second memory storing information for identifying at least one removable component and status information about a lifetime of each removable component, and wherein the first communication unit comprises a memory access unit configured to access the second memory.

8. A system for printing a label according to claim 1, wherein the information for identifying the removable component to be returned is represented by a barcode embedded in the label.

9. A system for printing a label according to claim 1, further comprising a printer connected to the user network, wherein the second communication unit is configured to send data representing the label to the printer.

10. A system for printing a label according to any one of claims 1 to 5, wherein the first communication unit comprises a memory storing information for identifying the appliance.

11. A system for printing a label according to claim 10, wherein the request sent by the first communication unit to the remote server includes the information identifying the appliance.

12. A system for printing a label according to any one of claims 1 to 5, wherein the appliance comprises a printing device.

13. A label server for generating a label to be used for returning a removable component of an appliance, the server being connected to a network and being configured to communicate with at least one local server connected to the network, the label server comprising:

a reception unit configured to receive, from a local server, a request to send the local server data representing a label to be used to return a removable component, the request including information identifying the removable component;

a retrieval unit configured to retrieve from the request the information identifying the removable component;

an authentication unit configured to authenticate the information identifying the removable component;

a data generation unit configured to generate data representing a label to be used to return the removable component, the label including data representing the information identifying the component, wherein the data representing the label is generated only if the information identifying the removable component has been correctly authenticated; and a transmission unit configured to send to the local server the data representing the label.

14. A label server for generating a label to be used for returning a removable component according to claim 13, further comprising a memory access unit configured to access a memory storing authentication data.

15. A label server for generating a label to be used for returning a removable component according to claim 14, wherein the information identifying the removable component is authenticated by the authentication unit if the authentication data stored in the memory includes data associated with the information identifying the removable component.

16. A label server for generating a label to be used for returning a removable component according to claim 14, wherein the memory is included in the label server.

17. A label server for generating a label to be used for returning a removable component according to claim 13, wherein the request received from the local server includes information for identifying the appliance, the information identifying the appliance being used by the authentication unit to authenticate the request received from the local server.

18. A server for generating a label to be used for returning a removable component according to claim 13, wherein the information identifying the removable component is included in the label and is represented as a barcode embedded in the label.

19. A method for printing in a user network a label to be used to return a removable component, the user network comprising a local server configured to communicate through a second network with a remote server, and comprising an appliance including a removable component, the removable component including a memory storing information for identifying the removable component, wherein the method comprises the steps of:

determining a condition regarding an end of lifetime of the removable component;

reading the information for identifying the removable component from the memory;

sending a request to the remote server, when the condition regarding the end of lifetime of the removable component has been determined, to receive data representing a label to be used to return the removable component, the request including the information identifying the removable, component; and receiving, from the remote server, data representing information to be included in images on a label to be printed and used to return the removable component, the images representing the information identifying the removable component to be returned.

20. A method for printing in a user network a label according to claim 19, further comprising step of sending a triggering message to the local server when the condition regarding the end of lifetime of the removable component has been determined.

21. A method for printing in a user network a label according to claim 19, wherein the information identifying the removable component is represented by a barcode embedded in the label.

22. A method for printing in a user network a label according to claim 19, wherein the request sent to the remote server includes information identifying the appliance.

23. A method for printing in a user network a label according to claim 19, further comprising the step of printing the label.

24. A method for generating, in a label server, a label to be used for returning a removable component of an appliance, the label server being connected to a network and being configured to communicate through the network with at least one local server, the method comprising the steps of:

receiving from a local server a request to send the local server data representing a label to be used to return a removable component, the request including information for identifying the removable component;

retrieving from the request the information identifying the removable component;

authenticating the information identifying the removable component;

generating data representing a label to be used to return the removable component, the label including data representing the information identifying the removable component, wherein the data representing the label is generated only if the information identifying the removable component has been correctly authenticated; and sending to the local server the data representing the label.

25. A method for generating, in a label server, a label to be used for returning a removable component according to claim 24, wherein the step of authenticating the information identifying the removable component includes accessing authentication data stored in a memory accessible by the label server.

26. A method for generating, in a label server, a label to be used for returning a removable component according to claim 25, wherein the information identifying the removable component is authenticated if the authentication data stored in the memory includes data associated with the information identifying the removable component.

27. A method for generating, in a label server, a label to be used for returning a removable component according to claim 24, wherein the request received from the local server includes information identifying the appliance, and wherein the authentication step includes using the information identifying the appliance to authenticate the request received from the local server.

28. A method for generating, in a label server, a label to be used for returning a removable component according to claim 24, wherein the information identifying the removable component is included in the label and is represented as a barcode embedded in the label.

29. A component configured to be incorporated in and removed from an appliance that is connected to a user network, the component comprising a memory storing information for identifying the component, wherein the information stored in the memory is used to create a label having images representing the information, the label to be printed and used for returning the component when a condition regarding an end of lifetime of the component has been determined.

30. A component according to claim 29, wherein the information identifying the component is unique to the component.

31. A component according to claim 29, further comprising an access control unit configured to allow information stored in the memory to be accessible to the appliance in which the component is located.

32. A local server programmed to perform a method as set out in any one of claims 19 to 23, wherein the programmed method is stored in a computer-readable storage medium.

33. A computer-readable storage medium storing instructions for programming a processing apparatus to perform a method as set out in any one of claims 19 to 28.

34. A computer program product embodying a computer-readable program for programming a processing apparatus to perform a method as set out in any one of claims 19 to 28.

35. A signal carrying computer-readable instructions for programming a processing apparatus to perform a method as set out in any one of claims 19 to 28.

36. A system for printing, within a user network, a label to be used to return a component, comprising:

an appliance connected to the user network, the appliance including:

at least one removable component, each removable component being provided with a memory storing information for identifying that removable component, and a detector configured to detect a condition regarding an end of lifetime of a removable component located within the appliance; and a local server connected to the user network and configured to communicate with at least one remote server through a second network, and with the appliance through the user network the local server being configured:

to send to the remote server a request to receive data representing a label to be used to return a component, when a condition regarding an end of lifetime of the component to be returned, which is located within the appliance, has been detected by the detector, the request including information for identifying the component to be returned, and to receive from the remote server the data representing the label to be used to return the component, the label including the information identifying the component to be returned.

37. A system according to claim 36, wherein the local server is located within the appliance.

38. A system according to claim 37, further comprising a printer connected to the user network, wherein the local server sends the data representing the label to the printer.

39. A system according to claim 36, wherein the appliance comprises a printer.

* * * * *

UNITED STATES PATENT AND TRADEMARK OFFICE

CERTIFICATE OF CORRECTION

PATENT NO. : 7,208,020 B2
APPLICATION NO. : 10/751716
DATED : April 24, 2007
INVENTOR(S) : Maarten Joost De Mol Van Otterloo It is certified that error appears in the above-identified patent and that said Letters Patent is hereby corrected as shown below:

Title Page; [73] ASSIGNEE

"Canon Europa N.V., Amatelveen (NL)" should read --Canon Europa N.V., Amstelveen (NL)--.

COLUMN 2

Line 16, "take," should read --take--.
Line 23, "outlines" should read --outlined--.

COLUMN 3

Line 24, "network" should read --network.--.
Line 29, "located" should read --located in--.
Line 36, "being" should read --been--.
Line 39, "to" should be deleted.
Line 41, "ing," should read --ing--.

COLUMN 4

Line 42, "identification" should read --identification of--.

COLUMN 5

Line 37, "or returning old" should read --or returning an old--.
Line 47, "lb" should read --1B--.
Line 64, "individuals" should read --individual--.
Line 67, "temporally" should read --temporarily--.

COLUMN 7

Line 40, "referred" should read --referred to--.
Line 43, "approaching of" should read --approaching--.
Line 63, "consisting in" should read --consisting of--.

UNITED STATES PATENT AND TRADEMARK OFFICE

CERTIFICATE OF CORRECTION

PATENT NO. : 7,208,020 B2
APPLICATION NO. : 10/751716
DATED : April 24, 2007

INVENTOR(S) : Maarten Joost De Mol Van Otterloo

It is certified that error appears in the above-identified patent and that said Letters Patent is hereby corrected as shown below:

COLUMN 8

Line 26, “absent of” should read --absent from--.
Line 65, “execute” should read --executes--.

COLUMN 9

Line 24, “in” should read --is--.
Line 65, “component If” should read --component. If--.

COLUMN 10

Line 4, “input” should read --input.--.
Line 15, “Internet” should read --Internet.--.
Line 17, “might-be” should read --might be--.
Line 63, “used” should read --use--.
Line 67, “provide box” should read --provide the box--.

COLUMN 11

Line 2, “dropped-off” should read --dropped off--.

COLUMN 13

Line 9, “service,” should read --service--.
Line 50, “manufacturer, the” should read --manufacturer. The--.
Line 56, “performs” should read --performed--.

UNITED STATES PATENT AND TRADEMARK OFFICE

CERTIFICATE OF CORRECTION

PATENT NO. : 7,208,020 B2
APPLICATION NO. : 10/751716
DATED : April 24, 2007
INVENTOR(S) : Maarten Joost De Mol Van Otterloo It is certified that error appears in the above-identified patent and that said Letters Patent is hereby corrected as shown below:

<u>COLUMN 15</u>

Line 5, “send” should read --sent--.

<u>COLUMN 17</u>

Line 28, “removable,” should read --removable--.
Line 35, “step” should read --a step--.

Signed and Sealed this

Twenty-ninth Day of January, 2008

Jon W. Dudas

JON W. DUDAS
*Director of the United States Patent and Trademark Office*